(12) United States Patent
Huang

(10) Patent No.: US 8,085,471 B2
(45) Date of Patent: Dec. 27, 2011

(54) LIGHT INTEGRATING DEVICE FOR AN ILLUMINATION SYSTEM AND ILLUMINATION SYSTEM USING THE SAME

(75) Inventor: June-Jei Huang, Taoyuan Hsien (TW)

(73) Assignee: Delta Electronics, Inc., Taoyuan Hisen (TW)

( * ) Notice: Subject to any disclaimer, the term of this patent is extended or adjusted under 35 U.S.C. 154(b) by 326 days.

(21) Appl. No.: 12/484,747

(22) Filed: Jun. 15, 2009

(65) Prior Publication Data

US 2010/0007964 A1 Jan. 14, 2010

(30) Foreign Application Priority Data

Jul. 10, 2008 (TW) .............................. 97126159 A

(51) Int. Cl.
*G02B 27/14* (2006.01)
(52) U.S. Cl. ........................................ 359/638; 359/629
(58) Field of Classification Search .................. 359/629, 359/638, 634
See application file for complete search history.

(56) References Cited

U.S. PATENT DOCUMENTS 5,379,286 A 1/1995 Miyamoto

FOREIGN PATENT DOCUMENTS

| CN | 1226726 C | 11/2005 |
| CN | 101042225 A | 9/2007 |

*Primary Examiner* — Jack Dinh
(74) *Attorney, Agent, or Firm* — Patterson Thuente Christensen Pedersen, P.A.

(57) ABSTRACT

A light integrating device for an illumination system and an illumination system. The illumination system includes a first light source module and a second light source module providing a first light and a second light, respectively. The device includes first and second light collecting elements and a beam splitting element. The first light travels into the first light collecting element and is split into a plurality of light groups by the beam splitting element. At least one light group travels into the second light collecting element from the beam splitting element. The second light travels into the second light collecting element, is reflected by the beam splitting element and emits out from the second light collecting element along the principle axis of the light integrating device together with the at least one light group which is split from the first light and travels into the second light collecting element.

14 Claims, 7 Drawing Sheets

LIGHT INTEGRATING DEVICE FOR AN ILLUMINATION SYSTEM AND ILLUMINATION SYSTEM USING THE SAME

This application claims priority to Taiwan Patent Application No. 097126159 filed on Jul. 10, 2008.

CROSS-REFERENCES TO RELATED APPLICATIONS

Not applicable.

BACKGROUND OF THE INVENTION

1. Field of the Invention

The present invention relates to an illumination system for a projection display, and more particularly, relates to a hybrid illumination system and a light integrating device for the hybrid illumination system.

2. Descriptions of the Related Art

The rapid development of science and technology has led to the constant improvement of information display technology and an increasingly widespread application of projection systems. Accordingly, a high demand is placed on the imaging quality of the projection systems by users. One of the important factors of evaluating the imaging quality is the brightness of an image. The brightness of the image usually depends on the luminance of the light source, light collecting efficiency, light uniformizing efficiency, light relaying efficiency and similar factors. When the luminous efficiency is restricted by the étendue of a projection system, one of the solutions for providing better luminous power is to provide a brighter and more efficient light source. However, such a light source is often very expensive and has a short life cycle. Furthermore, it usually has a bulky volume, which further increases the overall dimensions of the system.

In a high-luminance projection system, a xenon bulb or a number of ultra high pressure mercury lamps (UHPs) are often used as the light source. However, the xenon bulb has a short life cycle and a higher cost. On the other hand, when a number of UHPs are used as the light source, it would impose difficulty on the designs and applications of a system to minimize the lost of luminous efficiency due to the increasing étendue of the system. Moreover, in terms of spectrum output, UHPs have complete spectrum distributions and high intensity in the blue and green light region, while the output in red light has an incomplete spectrum and insufficient intensity.

To reduce costs, UHPs in combination with an LED or a laser are commonly used to form a hybrid illumination system to reinforce the red spectrum of the UHPs. Compared to LEDs, lasers have narrow bandwidth and with a very small étendue. Hence, if UHPs are employed to output the blue and green lights, while the red laser is employed to reinforce the insufficient red lights, luminance in the red light region can be even higher than that of the xenon bulb and a higher overall illumination efficiency can be obtained. Therefore, a hybrid light source consisting of UHPs and a red laser can not only overcome the restriction of luminance provided by a number of UHPs, but also provide a wider color gamut due to the addition of the red laser.

FIG. 1 illustrates a conventional hybrid illumination system 1, which comprises an UHP 11, two laser sources 12, a first lens array 13, a second lens array 14, a panel 15 and two reflecting prisms 16. The light source of the hybrid illumination system 1 is a mix of light emitted from the UHP 11 and the laser source 12. More specifically, the first and the second lens arrays 13, 14 are disposed between the UHP 11 and the panel 15. Light emitted from the UHP 11 travel through several lenslets of the first lens array 13 and then focus on corresponding lenslets of the second lens array 14. Then, light transmitting through individual lenslets of the second lens array 14 are all deflected and projected to the panel 15 with the light overlapping each other on the panel 15. On the other hand, light emitted from the laser source 12 is condensed and reflected by the reflecting prism 16 to the lenslets of the first lens array 13. Likewise, these lights are also projected by the corresponding lenslets of the second lens array 14 onto the panel 15 to overlap with the light from the UHP 11. Although the above structure may mix light, this illumination system has a prominent shortcoming; specifically, the UHP 11 and the laser source 12 have different étendues, i.e. a portion of the light will be discarded rather than become effective light, so the overall illumination efficiency of the system is decreased. Furthermore, the lasers disposed on both sides extend not only the étendue, but also the volume of the system.

FIG. 2 depicts another conventional hybrid illumination system 2, which comprises an UHP 21, a laser source 22 and a dichroic beam splitter 23. The red light supplied by the laser source 22 is reflected by the dichroic beam splitter 23 before being incorporated into the illuminating path of the UHP 21. This method of mixing light sources may avoid the different étendues between the different light sources as was seen in the hybrid illumination system 1. However, to use such a hybrid illumination system, the use of an additional dichroic beam splitter 23 or other relay optics must be considered in the early steps of designing the light path of the system, making the completed system design less flexible during modification. Consequently, when being applied to another illumination system or adding other different light sources as desired, the system structure often has to be redesigned.

In summary, the conventional hybrid illumination systems used in projection displays either fail to provide high illumination efficiency due to the additional étendues by the additional light sources (laser source) or lack flexibility in modifying the étendues of the conventional light source. In view of this, it is important to provide a hybrid illumination system that adds no additional étendues and provides the flexibility for combining other light sources.

SUMMARY OF THE INVENTION

The primary objective of this invention is to provide a light integrating device for a hybrid illumination system. With this light integrating device, a projection system using this hybrid illumination system allows the provision of a plurality of light sources simultaneously, and prevents the decrease of the illumination efficiency of individual light sources due to additional étendues thereof. Furthermore, with the particular design of the light integrating device, the projection system can provide a light output with a complete spectrum and sufficient light intensity by mixing various light sources. In addition, the illumination system of this invention can be readily used for replacement without changing the original design of an existing projection system.

This invention provides a light integrating device and an illumination system using the same. The illumination system comprises the light integrating device, a first light source module and a second light source module. The first and the second light source modules are adapted to provide a first light and a second light respectively. The light integrating device comprises a principal axis, a first light collecting element, a second light collecting element and a beam splitting element. After the first light enters the first end portion of the first light collecting element, the beam splitting element is adapted to split the first light into a plurality of light groups. The plurality of light groups have at least one light group adapted to transmit through the beam splitting element into the second light collecting element. After the second light enters the second incident portion of the second light collecting element, the second light is adapted to be reflected by the beam splitting element and emit out from the outlet portion of the second light collecting element along the principal axis together with the light group.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
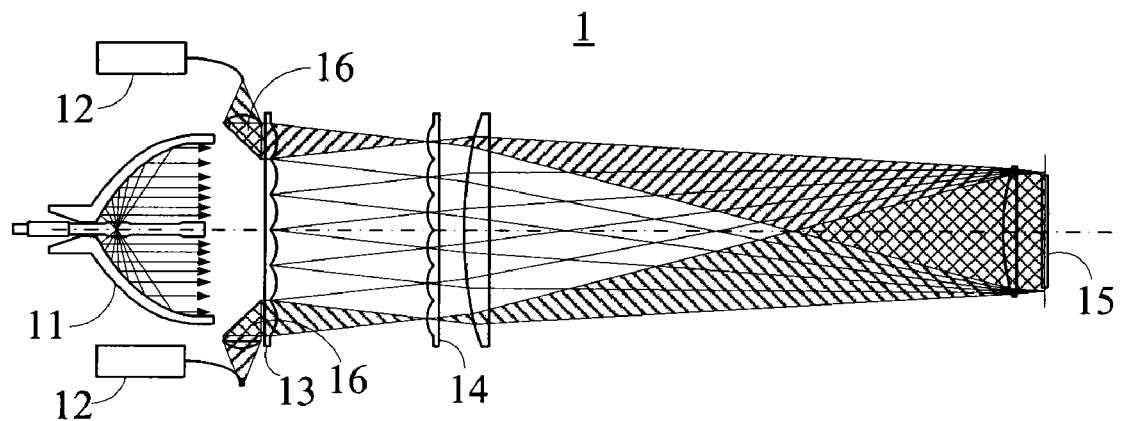
FIG. 1 is a schematic view of a conventional hybrid illumination system.
Figure 2:
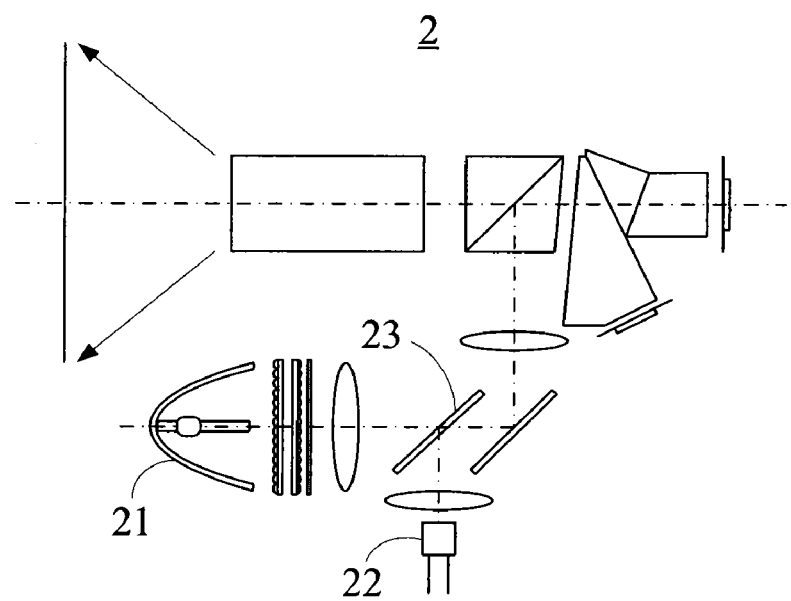
FIG. 2 is a schematic view of another conventional hybrid illumination system.
Figure 3:
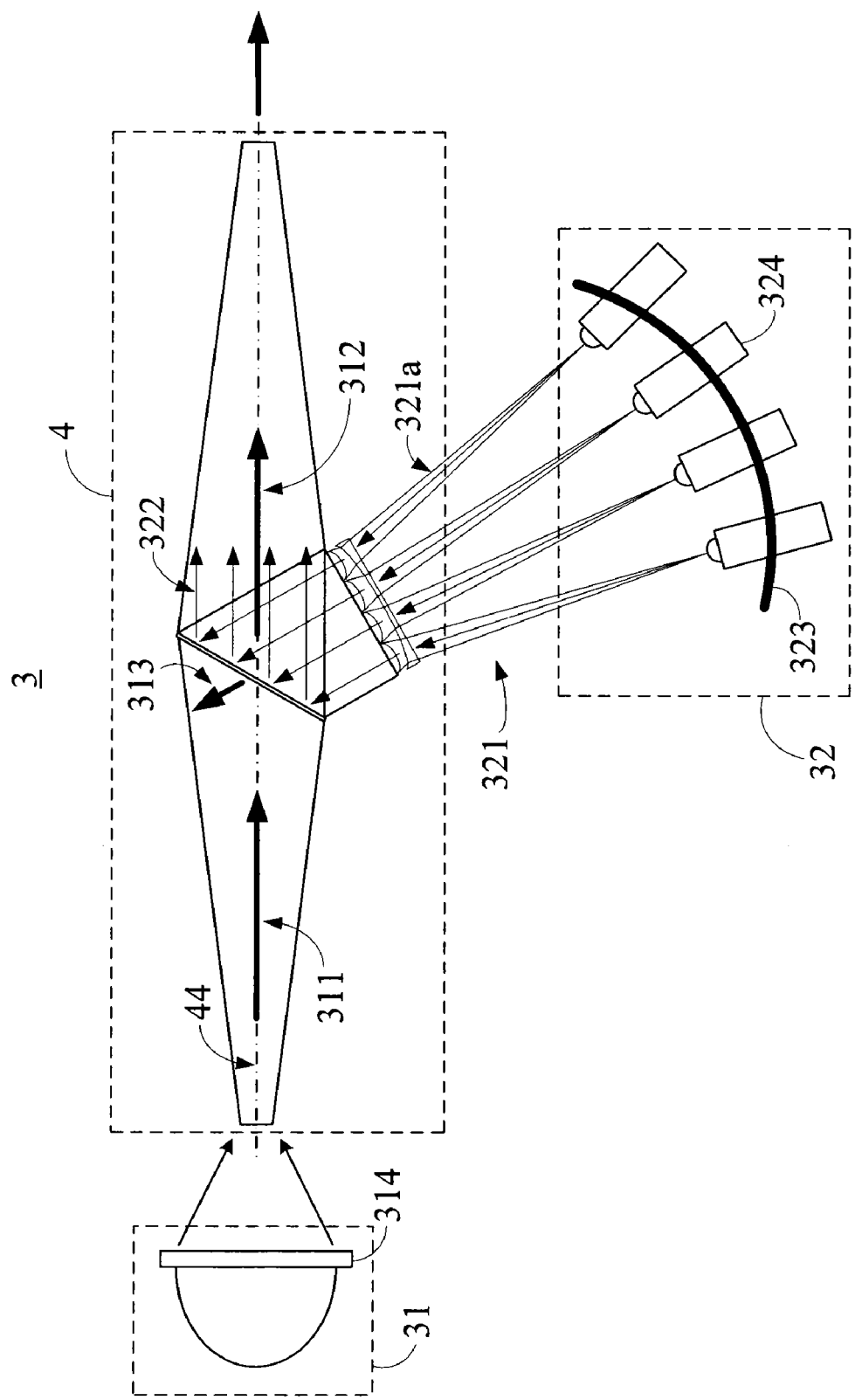
FIG. 3 is a schematic view of an illumination system according to a first embodiment of this invention.
Figure 4:
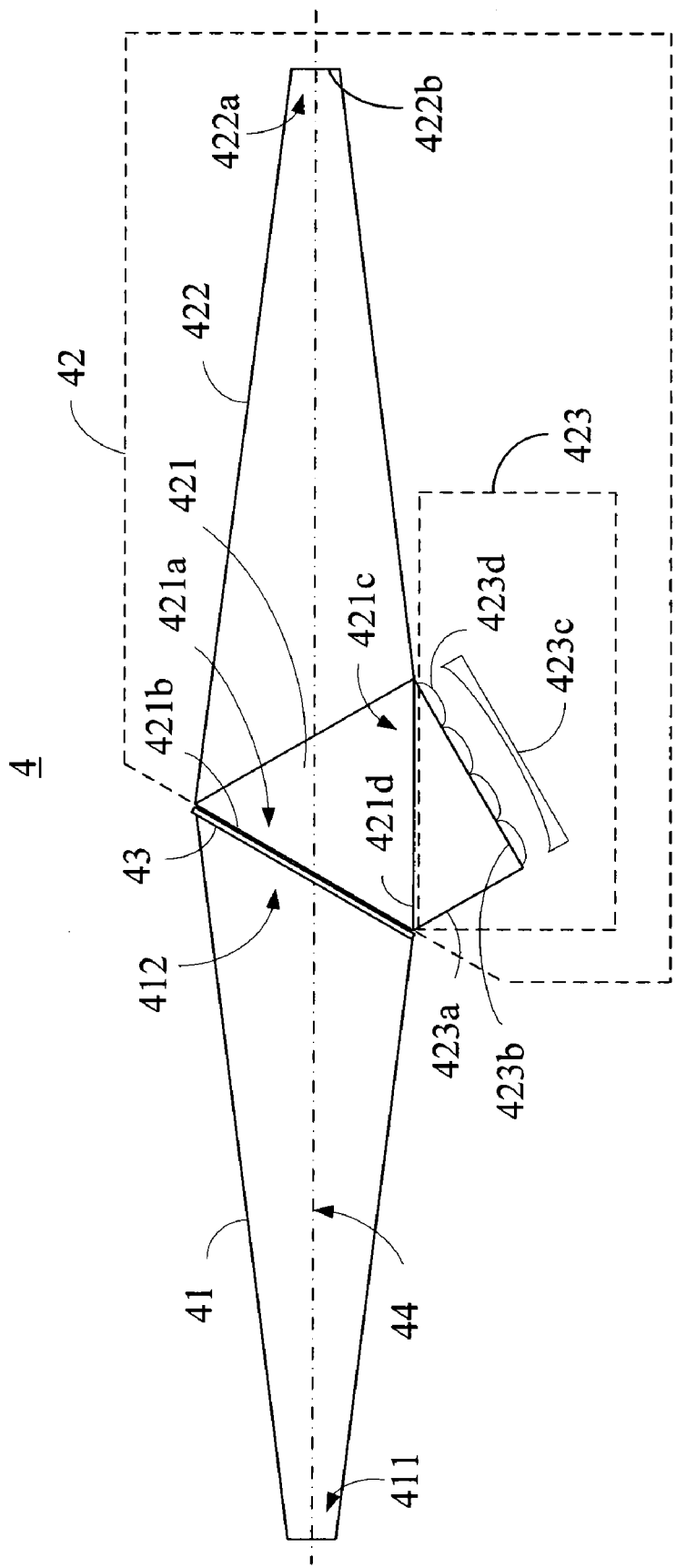
FIG. 4 is a schematic view of a light integrating device according to the first embodiment of this invention.

The embodiment of this invention is an illumination system, a schematic view of which is depicted in FIG. 3. The illumination system 3 is used for a projection system (not shown). The illumination system 3 comprises a first light source module 31, a second light source module 32 and a light integrating device 4. FIG. 4 is a schematic view of the light integrating device 4.

The first light source module 31 and the second light source modules 32 are adapted to provide a first light 311 and a second light 321 respectively. Both the first light source module 31 and the second light source module 32 comprise at least one light source. In this embodiment, the first light source module 31 is an UHP 314, while the second light source module 32 comprises a laser array base 323 and a plurality of laser units 324. The second light 321 comprises a plurality of sub-lights 321a provided by each of the laser units 324. The types, numbers and positions of the light sources in the first and the second light source modules 31, 32 are not limited to what is described above. Instead, other implementations may also occur to those skilled in the art. For example, the second light source module 32 may use a single laser unit instead to provide a single laser beam.

The light integrating device 4 primarily comprises a first light collecting element 41, a second light collecting element 42, a beam splitting element 43 and a principal axis 44. The first light collecting element 41 has a first end portion 411 and a second end portion 412 opposite the first end portion 411.

The second light collecting element 42 comprises a first prism 421, a light converging portion 422 and an extended portion 423. A first incident portion 421a, an outlet portion 422a opposite to the first incident portion 421a and a second incident portion 421c are defined within the second light collecting element 42. The beam splitting element 43 is disposed between the first light collecting element 41 and the second collecting element 42. In particular, the splitting element 43 is a beam splitter disposed between the second end portion 412 and the first incident portion 421a. In other preferred examples, the beam splitting element 43 may be coated with multilayered optical films.

The beam splitting element 43 has different color splitting effects on the same light with different incident angles, which is known as the dichroic shift phenomenon. According to the étendue principle, the smaller the incident area, the larger the incident angle. Consequently, the dichroic shift phenomenon will be more obvious. To minimize the effect of dichroic shift so that the sub-lights 321a can be reflected by the beam splitting element 43, the filtering band of the beam splitting element 43 must be adjusted to be wider to reduce the loss of the second light 321 when outputted from the illumination system 3 and thus make full use of the second light 321. However, for the first light 311 provided by the first light source module 31, the light amount that is transmitted through the beam splitting element 43 decreases correspondingly. Therefore, to improve the utilization efficiency of the first light 311, areas of the beam splitting element 43 and the adjacent elements are enlarged in this embodiment to decrease the dichroic shift by reducing the angle of the incident light.

Figure 5:
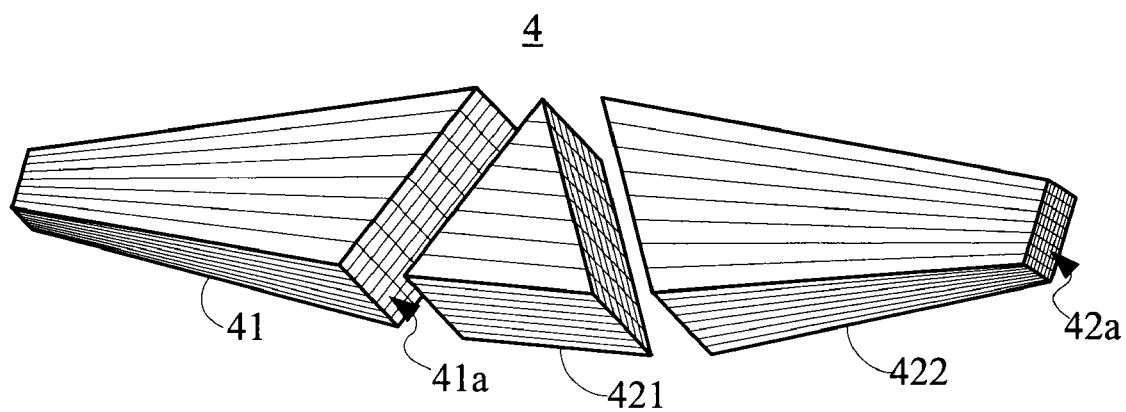
FIG. 5 is a schematic exploded view of the light integrating device of this invention.

As shown in FIG. 5, the first light collecting element 41, the beam splitting element 43, the first prism 421 and the light converging portion 422 are disposed in sequence adjacent to each other. The first prism 421 is an isosceles triangular prism with equal dimensions at the left and right sides. To adapt to a beam splitting element 43 with a large area, the first light collecting element 41 is shaped as a tapered rod, with the right side thereof corresponding to and having the same dimensions as those of the left side of the beam splitting element 43. In turn, the left side of the first prism 421 has the same dimensions as those of the beam splitting element 43. Also, the light converging portion 422 is shaped like a tapered rod, with the left side thereof corresponding to and having the same dimensions as the right side of the first prism 421. More specifically, the first light collecting element 41 has a first cross-sectional area 41a, which increases from the first end portion 411 of the first light collecting element 41 towards the second end portion 412. The light converging portion 422 has a second cross-sectional area 42a, which decreases towards the outlet portion 422a. In this embodiment, both the first light collecting element 41 and the light converging portion 422 are tapered light integrating rods, although they are not merely limited thereto.

In the second light collecting element 42, the first prism 421 has a first incident surface 421b and a second incident surface 421d disposed on the first incident portion 421a and the second incident portion 421c respectively to receive the first light 311 and the second light 321. The light converging portion 422 has an outlet surface 422b disposed on the outlet portion 422a to converge and uniformize the light. As described above, the first prism 421 should preferably be an isosceles triangular prism, and more preferably an equilateral triangular prism to obtain a maximum light utilization efficiency by guiding the second light 321 to travel along a particular light path.

The extended portion 423 comprises a second prism 423a adjacent to the second incident surface 421d, a concave lens 423c and a lens array 423d. The second prism 423a has a third incident surface 423b adapted to receive the second light 321. The concave lens 423c is adapted to adjust the directions of the light cones of the sub-lights 321a to impinge on the second prism 423a with the same incidence angle. The lens array 423d is adapted to convert the light cones of sub-lights 321a into collimated lights. With the aforesaid arrangement, it is possible to prevent the sub-lights 321a from impinging on the second prism 423a at different angles due to the different positions of the individual laser units 324, thus allowing the sub-lights 321a to enter the light integrating device 4 in a telecentric manner. The principal axis 44 is adapted to pass through the center of the first light collecting element 41, the beam splitting element 43, the first prism 421 and the light converging portion 422 simultaneously to define the principle traveling path of light. The paths of the lights from the first and the second light source modules 31, 32 respectively will be detailed as follows.

The first light 311 leaving the first light source module 31 travels along the principal axis 44 and enter the first light collecting element 41 via the first end portion 411 thereof. The first light 311 will then travel through the second end portion 412 of the first light collecting element 41 and come to the beam splitting element 43. The beam splitting element 43 splits the first light 311 into a first light group 312 and a second light group 313. The first light group 312 transmits through the beam splitting element 43, enters the first prism 421 through the first incident surface 421b, travels towards the outlet portion 422a along the principal axis 44 and finally exits from the light integrating device 4 via the outlet surface 422b. On the other hand, the second light group 313 is separated from the first light 311 by the reflection of the beam splitting element 43. The beam splitting element 43 may also split the first light 311 into a plurality of light groups rather than being limited to two light groups.

Firstly, the light cones of the sub-lights 321a of the second light 321 from the second light source modules 32 are changed into collimated light by the lens array 423d and the directions of the light cones are turned into the same incident angle by the concave lens 423c. Next, the sub-lights 321a enters the second prism 423a via the third incident surface 423b, then enters the first prism 421 via the second incident surface 421d and finally travel towards the beam splitting element 43. The beam splitting element 43 splits the second light 321 into two light groups, wherein one of the two light groups which contains most of the second light 321 is the third light group 322 which is reflected from the beam splitting element 43. Then, the third light group 322 together with the first light group 312 travel towards the outlet portion 422a along the principal axis 44, and are converged together uniformly in the light converging portion 422 before exiting from the light integrating device 4 via the outlet surface 422b.

In this embodiment, the wavelength of the reflective band of the beam splitting element 43 should be designed with a range between 600 nm and 630 nm to make full use of the laser light ranging between 618 nm and 621 nm provided by the laser units 324. Thus, the part of the light from the UHP 314, which has insufficient luminance in the red light region of the spectrum can be replaced by the lasers with the wavelength in the same region. Therefore, the third light group 322 provided by the laser unit 324 and reflected by the beam splitting element 43 is a red light within a wavelength in a range between 618 nm and 621 nm. The second light group provided by the UHP 314 and reflected by the beam splitting element 43 is a red light within a wavelength in a range between 600 nm and 630 nm. In contrast, the first light group 312 transmitted through the beam splitting element 43 includes lights with wavelengths other than that of the second light group 313, such as blue light, green light and red light outside the band of 600 nm to 630 nm. In other examples, the reflective band of the beam splitting element 43 may also range between 618 nm and 621 nm, in which case the third light group 322 and the second light group 313 has a wavelength ranging between 618 nm and 621 nm. It should be appreciated that, in this embodiment, no air gaps exist between the first light collecting element 41, the light converging portion 422, the first prism 421 and the extended portion 423. In other examples, air gaps may be selectively provided therebetween to meet the requirements of other light path designs.

Figure 6A:
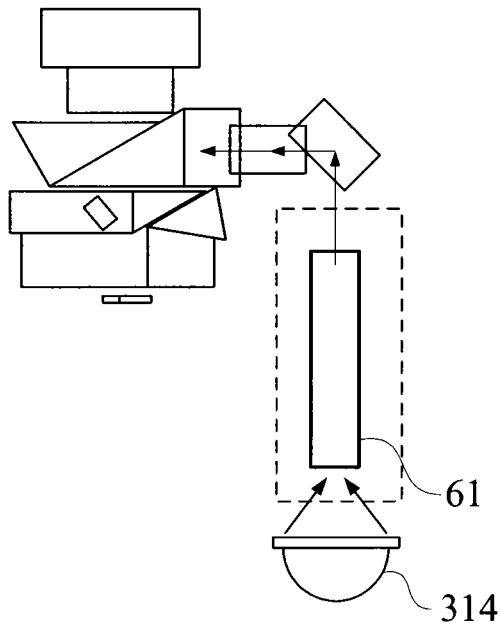
FIG. 6A is a schematic view of an existing projection system structure that adopts a single illumination system.
Figure 6B:
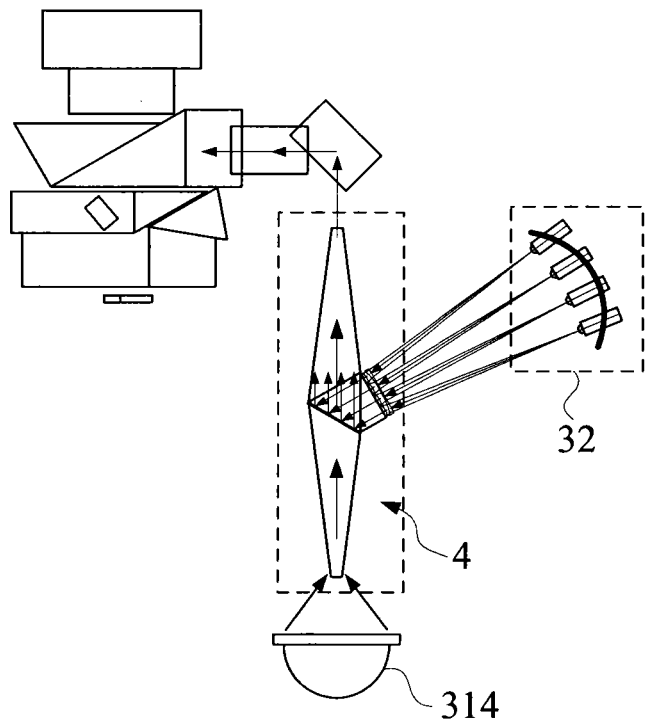
FIG. 6B is a schematic view of the projection system shown in FIG. 6A when adopting the illumination system of this invention instead.

FIG. 6A is a schematic view of a structure of an existing projection system 6, while FIG. 6B is a schematic view illustrating an interior structure of the projection system 6 shown in FIG. 6A when adopting the illumination system 3 of the first embodiment of this invention instead. These figures are intended to show how the illumination system of this invention can readily replace other illumination systems in existing projection systems. As shown in FIG. 6A, what is depicted in the dashed box is a light integrating rod 61 in the existing projection system. By simply replacing the light integrating rod 61 in the existing projection system 6 with the light integrating device 4 of this invention and without modifying the original light path design, the second light source module 32 can be readily added to provide the second light 321 and accomplish light integration. Thus, a projection system 6' with mixed light sources is obtained, as shown in FIG. 6B.

Figure 7:
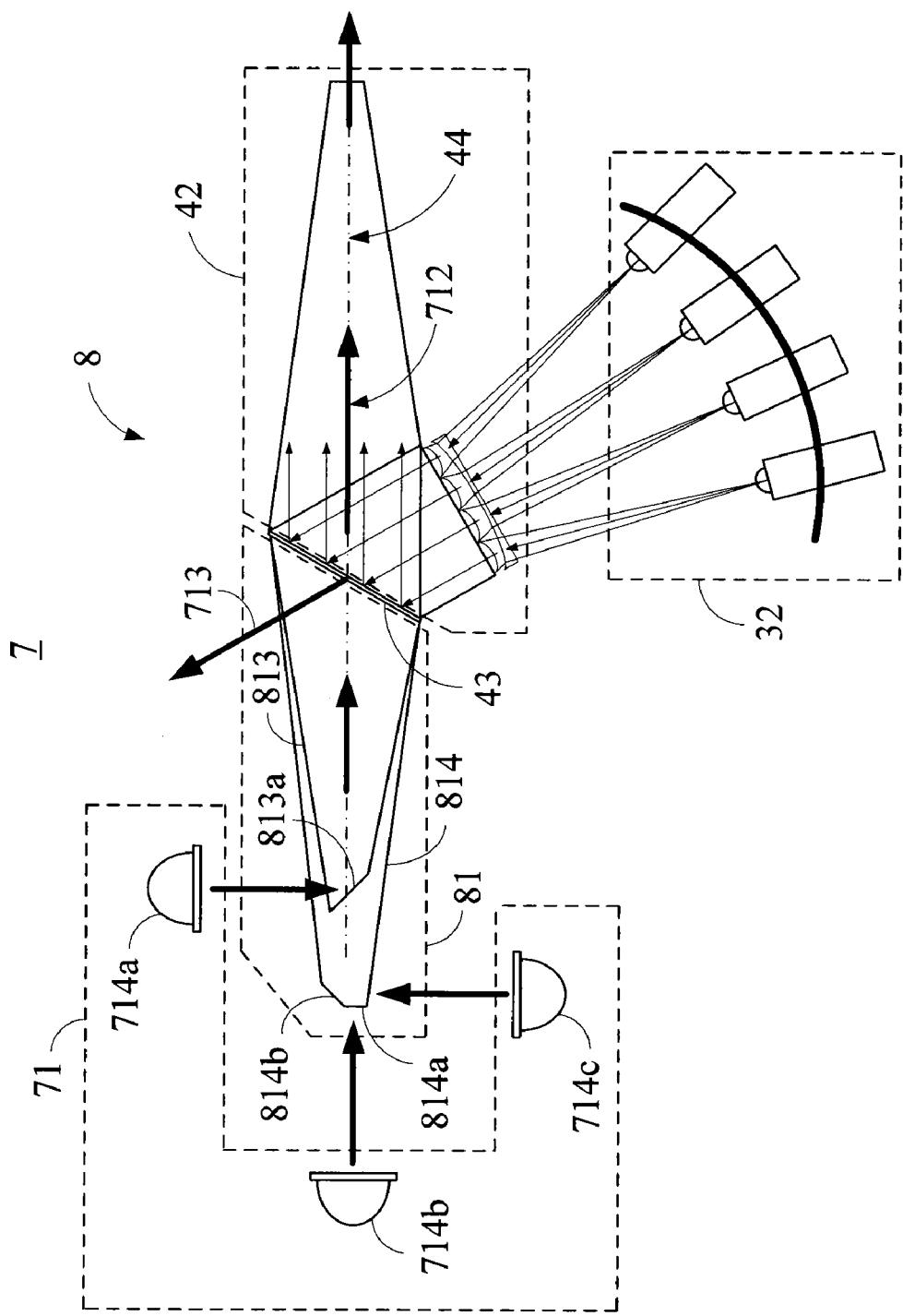
FIG. 7 is a schematic view of an illumination system according to a second embodiment of this invention.

FIG. 7 depicts a second embodiment of the illumination system of this invention. The illumination system 7 of this embodiment comprises a first light source module 71, a second light source module 32 and a light integrating device 8. Unlike the first embodiment, the first light source module 71 of this embodiment comprises a plurality of light sources.

The first light source module 71 comprises a first sub-light source 714a, a second sub-light source 714b and a third sub-light source 714c, each of which is an UHP. In other examples, these sub-light sources may also be LEDs or other kinds of light sources. In this embodiment, the second light source module 32 is identical to that of the first embodiment, and thus will not be further described herein.

Figure 8:
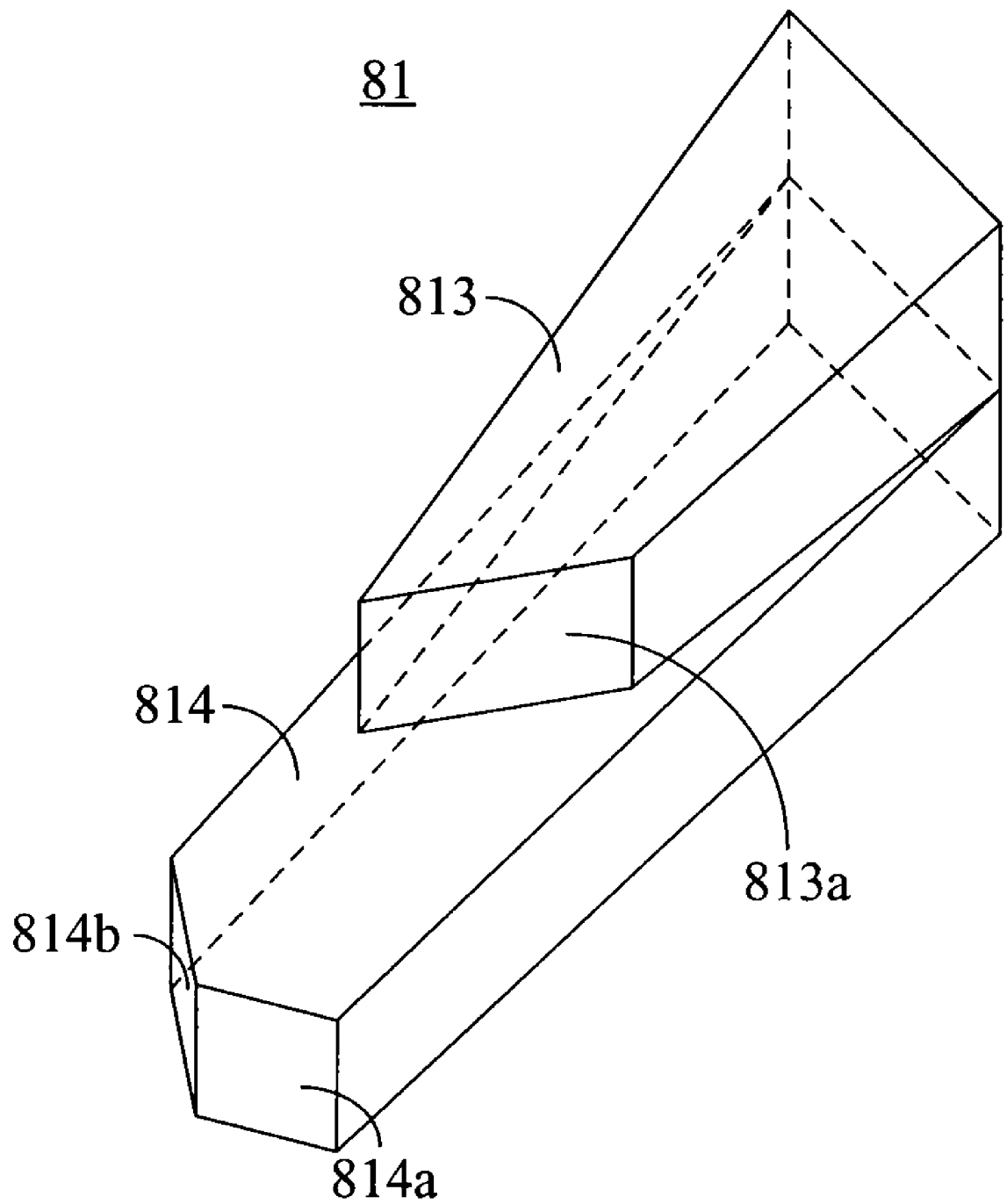
FIG. 8 is a schematic view of a first light collecting element in the second embodiment of this invention.

To cooperate with the plurality light sources 714a, 714b, 714c of the first light source module 71, the first light collecting element 81 of the light integrating device 8 of this embodiment has a corresponding number of light incident mechanisms. In more detail, as shown in FIG. 8, the first light collecting element 81 comprises a first tapered rod 813 and a second tapered rod 814. The first tapered rod 813 comprises a first tapered rod reflecting surface 813a. The second tapered rod 814, which is disposed adjacent to and under the first tapered rod 813, comprises a second tapered rod incident surface 814a and a second tapered rod reflecting surface 814b. In this embodiment, the first light collecting element 81 of the first embodiment is split into two portions, they are an upper tapered rod and a lower tapered rod respectively. The shapes of the tapered rods are modified according to the number and positions of the light sources to provide corresponding incident surfaces and/or reflecting surfaces. However, in other examples, the shape, the incident surfaces and the reflecting surfaces of the first light collecting element may be of other forms rather than being limited to what is described above. In this embodiment, the second light integrating element 42, the beam splitting element 43 and the principal axis 44 are identical to those of the first embodiment, and thus will not be further described herein.

The light from the first sub-light source 714a enters the first tapered rod 813 via the side thereof, and then travels to the beam splitting element 43 along the principal axis 44 after being reflected by the first tapered rod reflecting surface 813a. The light from the second sub-light source 714b enters the second tapered rod 814 via the second tapered rod incident surface 814a, and then travels to the beam splitting element 43 along the principal axis 44. The light from the third sub-light source 714c enters the second tapered rod 814 via a side thereof, and after being reflected by the second tapered rod reflecting surface 814b, the light from the third sub-light source 714c travels to the beam splitting element 43 along the principal axis 44. Similarly, the light generated by each of the sub-light sources 714a, 714b, 714c is split into a first light group 712 and a second light group 713 by the beam splitting element 43, in which the first light group 712 proceeds to travel into the second light collecting element 42 and the second light group 713 is reflected out of the light integrating device 8 by the beam splitting element 43.

This invention is not limited to such an expansion of the first light source module as described above, and those skilled in the art may replace it with other light source modules. Accordingly, a plurality of light sources may be readily added in the illumination system 7 to improve the luminance or widen the color gamut of the output light source.

The illumination system of this invention adopts a light integrating device of a particular design, so that the projection system using the illumination system of the invention will add no extra étendues by combining other light sources. Furthermore, with the particular design of the light integrating device, the projection system is able to provide the output light with a complete spectrum and sufficient light intensity by mixing various light sources. In addition, the illumination system of this invention can be readily used for replacing the existing projection system without changing the original design.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light integrating device for an illumination system, the illumination system comprising a first light source module and a second light source module, providing a first light and a second light respectively, the light integrating device comprising:
   a principal axis;
   a first light collecting element having a first end portion and a second end portion opposite to the first end portion;
   a second light collecting element having a first incident portion, an outlet portion opposite to the first incident potion and a second incident portion, wherein the second light collecting element comprises a first prism and a light converging portion, and the first light collecting element and the light converging portion are tapered and symmetrically disposed regarding the first prism; and
   a beam splitting element disposed between the second end portion and the first incident portion;
   wherein, after the first light enters the first end portion of the first light collecting element, the beam splitting element is adapted to split the first light into a plurality of light groups, in which the plurality of light groups have at least one light group adapted to transmit through the beam splitting element into the second light collecting element, and after the second light enters the second incident portion of the second light collecting element, the second light is adapted to be reflected by the beam splitting element and emit out from the outlet portion of the second light collecting element along the principal axis together with the at least one light group.

2. The light integrating device as claimed in claim 1, wherein the plurality of light groups have a first light group and a second light group, the at least one light group is the first light group substantially, the second light have a third light group, and after the third light group is reflected by the beam splitting element, the third light group is adapted to emit out from the outlet portion of the second light collecting element along the principal axis together with the first light group.

3. The light integrating device as claimed in claim 2, wherein the beam splitting element splits the second light group out from the first light by reflecting the second light group.

4. The light integrating device as claimed in claim 2, wherein the second light group and the third light group both are red lights.

5. The light integrating device as claimed in claim 1, wherein the first prism has a first incident surface disposed on the first incident portion and a second incident surface disposed on the second incident portion, in which the first incident surface and the second incident surface are adapted to receive the first light and the second light respectively, and the light converging portion has an outlet surface disposed on the outlet portion and is adapted to converge and uniformize the second light and the at least one light group.

6. The light integrating device as claimed in claim 5, wherein the second light collecting element further comprises an extended portion, the extended portion comprises a second prism adjacent to the second incident surface, and the second prism has a third incident surface adapted to receive the second light.

7. The light integrating device as claimed in claim 6, wherein the extended portion further comprises a concave lens, adapted to adjust the direction of the second light to enter the third incident surface with the same incidence angles.

8. The light integrating device as claimed in claim 7, wherein the second light comprises a plurality of sub-lights.

9. The light integrating device as claimed in claim 8, wherein the extended portion further comprises a lens array, adapted to change the light cones of the sub-lights into the collimated lights to enter the third incident surface.

10. The light integrating device as claimed in claim 1, wherein the first light collecting element has a first cross-sectional area, increasing gradually from the first end portion of the first light collecting element to the second end portion of the first light collecting element, and the light converging portion has a second cross-sectional area, decreasing gradually from the first incident portion of the second light collecting element to the outlet portion of the second light collecting element.

11. The light integrating device as claimed in claim 1, wherein the beam splitting element is a coated film or a beam splitter.

12. The light integrating device as claimed in claim 1, wherein the first prism is an isosceles triangular prism.

13. An illumination system, comprising
   a first light source module providing a first light;

a second light source module providing a second light; and the light integrating device as claimed in claim 1, wherein the light integrating device is adapted to receive the first light and the second light, split the first light into the plurality of light groups, in which the plurality of light groups have the at least one light group, and uniformize the at least one light group and the second light.

14. The illumination system as claimed in claim 13, wherein the plurality of light groups have a first light group and a second light group, the at least one light group is the first light group substantially, the second light has a third light group, and after the third light group is reflected by the beam splitting element, the third light group is adapted to emit out from the outlet portion of the second light collecting element along the principal axis together with the first light group.

* * * * *